(12) United States Patent
Li et al.

(10) Patent No.: US 8,797,880 B2
(45) Date of Patent: Aug. 5, 2014

(54) REMOTE NETWORK DEVICE COMPONENT TESTING

(75) Inventors: Xianzhi Li, Santa Clara, CA (US); Michael Luo, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 605 days.

(21) Appl. No.: 12/702,545

(22) Filed: Feb. 9, 2010

(65) Prior Publication Data

US 2011/0194425 A1 Aug. 11, 2011

(51) Int. Cl.
*H04L 12/26* (2006.01)

(52) U.S. Cl.
CPC ............ *H04L 12/2697* (2013.01); *H04L 43/50* (2013.01)
USPC .......................................... 370/241; 370/466

(58) Field of Classification Search
None
See application file for complete search history.

(56) References Cited

U.S. PATENT DOCUMENTS

| | | | |
|---|---|---|---|
| 6,175,530 B1 * | 1/2001 | Theron et al. ................. | 365/201 |
| 7,016,340 B1 * | 3/2006 | McKinion ..................... | 370/352 |
| 7,095,718 B1 * | 8/2006 | Terry ............................. | 370/241 |
| 7,269,724 B1 * | 9/2007 | Trimberger et al. .......... | 713/100 |
| 7,457,987 B2 * | 11/2008 | Franco et al. .................. | 714/32 |
| 7,801,050 B2 * | 9/2010 | Mitra ............................. | 370/242 |
| 8,059,547 B2 * | 11/2011 | Goishi et al. .................. | 370/241 |
| 8,130,660 B2 * | 3/2012 | Reniere et al. ................ | 370/249 |
| 8,185,877 B1 * | 5/2012 | Colcord ........................ | 717/127 |
| 2004/0222305 A1 * | 11/2004 | Leaming ....................... | 235/492 |
| 2006/0200718 A1 * | 9/2006 | Halliday et al. .............. | 714/727 |
| 2007/0174726 A1 * | 7/2007 | Nam et al. ...................... | 714/43 |
| 2007/0226702 A1 * | 9/2007 | Segger .......................... | 717/130 |
| 2008/0126655 A1 * | 5/2008 | Baier et al. .................... | 710/301 |
| 2008/0162678 A1 * | 7/2008 | Wang et al. ................... | 709/223 |
| 2009/0109864 A1 * | 4/2009 | Wang et al. ................... | 370/249 |
| 2010/0082128 A1 * | 4/2010 | Takahashi ...................... | 700/79 |

* cited by examiner

*Primary Examiner* — Brian D Nguyen
*Assistant Examiner* — Roberta A Shand
(74) *Attorney, Agent, or Firm* — Harrity & Harrity, LLP

(57) ABSTRACT

A network device receives, from a remote user device, a requested test that includes test Internet protocol (IP) packets, and converts the test IP packets into hardware test commands. The network device also performs, based on the hardware test commands, the requested test on a component of a network device card to produce hardware test results. The network device further converts the hardware test results into test results in an IP packet format, and provides the tests results in the IP packet format to the remote user device.

20 Claims, 7 Drawing Sheets

FIG. 3
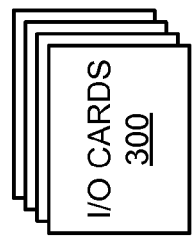
I/O CARDS
300
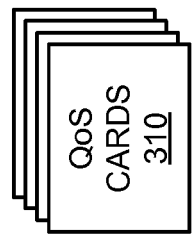
QoS CARDS
310
CFM CARDS
320
SECURE PROCESSING CARDS
330
OTHER CARDS
340
120

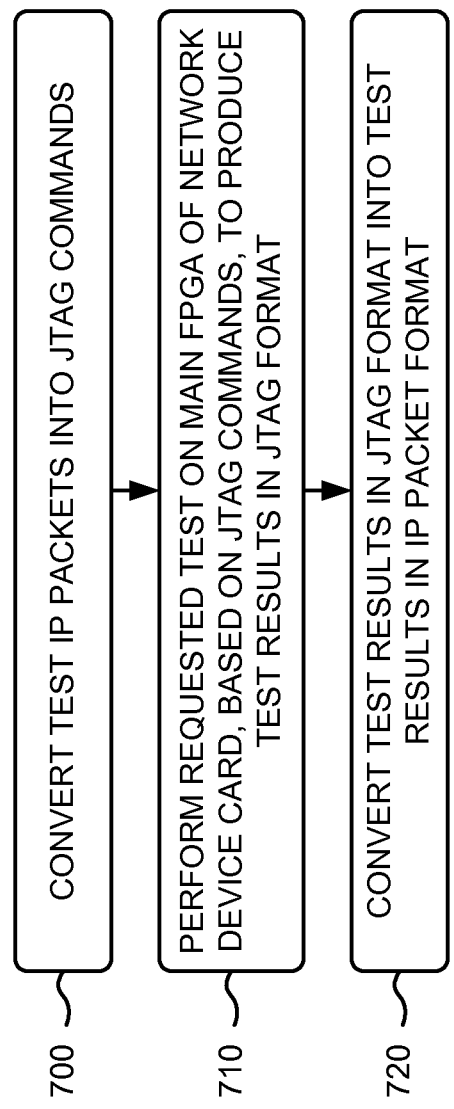

REMOTE NETWORK DEVICE COMPONENT TESTING

BACKGROUND

Computing and communication networks typically include network devices, such as routers, firewalls, switches, or gateways, which transfer or switch data, such as packets, from one or more sources to one or more destinations. Network devices may operate on the packets as the packets traverse the network, such as by forwarding or filtering the packet-based network traffic.

Network devices may include several types of cards (e.g., input/output cards, connectivity/configuration fault management (CFM) cards, etc.) that provide different functionalities for the network devices. Each card may include several types of components (e.g., processors, memories, interfaces, etc.) that provide functionalities for the card. In one example, each card may include a primary component (e.g., a main application-specific integrated circuit (ASIC), a main field-programmable gate array (FPGA), etc.) that controls the operation of the card.

An oscilloscope and a logic analyzer may be typically used to analyze and debug network device components (e.g., a FPGA). The oscilloscope/logic analyzer arrangement requires connecting signals provided by a network device component to pins provided externally to the network device so that a waveform (e.g., associated with analysis) may be captured by the oscilloscope and the logic analyzer (e.g., externally to the network device). In-circuit debug is a new technology that uses FPGA on-chip logic and memory to analyze a particular component of a network device (e.g., via direct connection with the network device), and to capture the waveform inside the network device. For example, a user can analyze the particular component (e.g., via direct connection with the network device) and capture the waveform via a FPGA joint test action group (JTAG) port. With in-circuit debug, a user can analyze the particular component with a single JTAG cable and software tools, and an oscilloscope and logic analyzer may be omitted.

Network device components (e.g., FPGAs) have become faster, denser, and more complex over the years, and, thus, field issues associated with such network device components have grown dramatically. Some field issues are difficult to reproduce in a lab environment. If an analysis of a network device component in a real field environment is required, a field technician must travel to a customer's site, shutdown the customer's system, remove a card (or board) containing the component, and connect a JTAG cable between the component and an external personal computer. The field technician may then perform an analysis of the component via the personal computer. Such an arrangement is time consuming, inconvenient to the customer, and expensive.

SUMMARY

According to one aspect, a method may be implemented by a network device. The method include receiving, by the network device and from a remote user device, a requested test that includes test Internet protocol (IP) packets, and converting, by the network device, the test IP packets into hardware test commands. The method may also include performing, by the network device and based on the hardware test commands, the requested test on a component of a network device card to produce hardware test results. The method may further include converting, by the network device, the hardware test results into test results in an IP packet format, and providing, by the network device, the tests results in the IP packet format to the remote user device.

According to another aspect, a network device may include a routing engine to receive, from a remote user device, a requested test that includes test Internet protocol (IP) packets, and provide the test IP packets to a control processor. The control processor may convert the test IP packets into hardware test commands, and provide the hardware test commands to a control manager of a network device card. The control manager may perform, based on the hardware test commands, the requested test on a component of the network device card to produce hardware test results, and may provide the hardware test results to the control processor. The control processor may further convert the hardware test results into test results in an IP packet format, and may provide the test results in the IP packet format to the routing engine. The routing engine may further provide the tests results in the IP packet format to the remote user device.

According to still another aspect, a system may include a user device to generate a requested test, and a network device remotely connected to the user device via a network. The network device may receive, from the user device, the requested test that includes test Internet protocol (IP) packets, and may convert the test IP packets into hardware test commands. The network device may also perform, based on the hardware test commands, the requested test on a component of a network device card to produce hardware test results. The network device may further convert the hardware test results into test results in an IP packet format, and may provide the tests results in the IP packet format to the remote user device.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a diagram of additional exemplary components of the network device depicted in FIG. 1;

FIGS. 6 and 7 are flow charts of an exemplary process for remotely testing a network device component according to implementations described herein.

DETAILED DESCRIPTION

The following detailed description refers to the accompanying drawings. The same reference numbers in different drawings may identify the same or similar elements. Also, the following detailed description does not limit the invention.

Implementations described herein may include systems and/or methods that may provide a technique for remotely testing (e.g., analyzing and/or debugging) a component of a network device. In an exemplary implementation, a network device may receive a requested test (e.g., that include test Internet protocol (IP) packets) from a remote user device, and may convert the test IP packets into hardware test commands (e.g., JTAG test commands). The network device may perform, based on the hardware test commands, the requested test on a primary component of a network device card to produce hardware test results. The network device may convert the hardware test results into test results in an IP packet format, and may provide the test results (e.g., in the IP packet format) to the remote user device.

The terms "component" and "device," as used herein, are intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Exemplary Network

Figure 1:
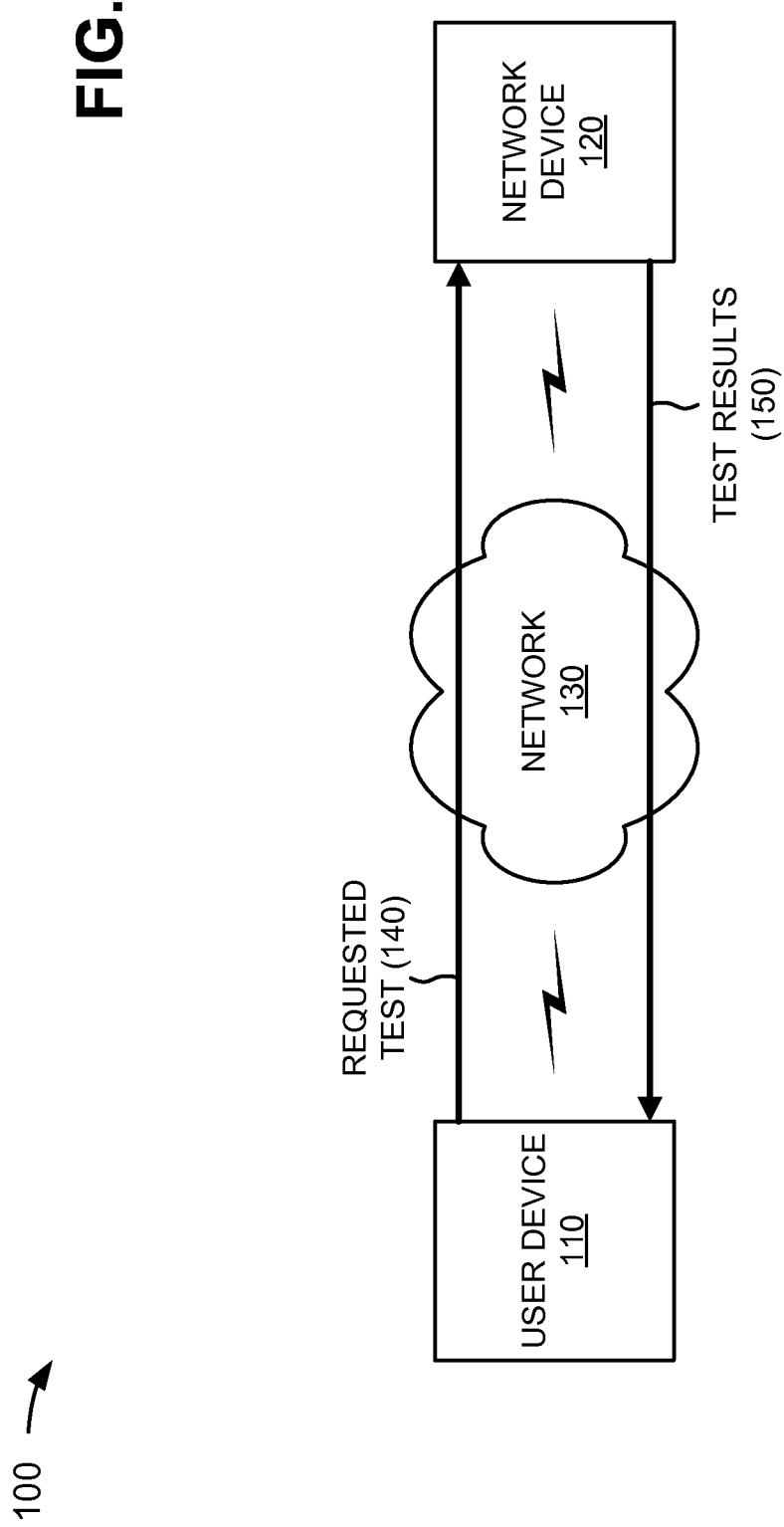
FIG. 1 is a diagram of an exemplary network in which systems and/or methods described herein may be implemented.

FIG. 1 is a diagram of an exemplary network in which systems and/or methods described herein may be implemented. As illustrated, network 100 may include a user device 110 and a network device 120 interconnected by a network 130. Components of network 100 may interconnect via wired and/or wireless connections or links. A single user device 110, network device 120, and network 130 have been illustrated in FIG. 1 for simplicity. In practice, there may be more user devices 110, network devices 120, and/or networks 130. Also, in some instances, one or more of the components of network 100 may perform one or more tasks described as being performed by another one or more of the components of network 100.

User device 110 may include any device that is capable of communicating with network device 120 via network 130. For example, user device 110 may include a laptop computer, a personal computer, a server device, or other types of computation or communication devices. In one exemplary implementation, user device 110 may include software for remotely analyzing and/or debugging one or more components of network device 120.

Network device 120 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an exemplary implementation, network device 120 may include a device that is capable of transmitting information to and/or receiving information from user device 110 via network 130. In one example, network device 120 may be provided within network 130.

Network 130 may include one or more networks of any type. For example, network 130 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

As further shown in FIG. 1, user device 110 may remotely test network device 120 (e.g., a component of network device 120) while network device 120 is operating in a real field environment. User device 110 may remotely connect with network device 120 (e.g., without shutting down network device 120 and/or removing the component from network device 120), and may provide a requested test 140 to network device 120. Requested test 140 may include information associated with analyzing and/or debugging a component of network device 120. For example, if the component of network device 120 (e.g., to be tested) is a FPGA provided by Xilinx, Inc.®, requested test 140 may include a test generated by the ChipScope™ software (e.g., in-circuit debug software) provided by Xilinx. The ChipScope software may include a client side and a server side, and user device 110 may execute the client side of the ChipScope software. Requested test 140 may be performed on the component of network device 120 to produce test results 150 (e.g., results associated with the analysis and/or debugging of the component). Network device 120 may provide test results 150 to user device 110, and user device 110 may perform further analysis on test results 150 (e.g., to determine any problems with the component of network device 120).

Although FIG. 1 shows exemplary components of network 100, in other implementations, network 100 may contain fewer components, different components, differently arranged components, or additional components than depicted in FIG. 1.

Exemplary Network Device Configuration

Figure 2:
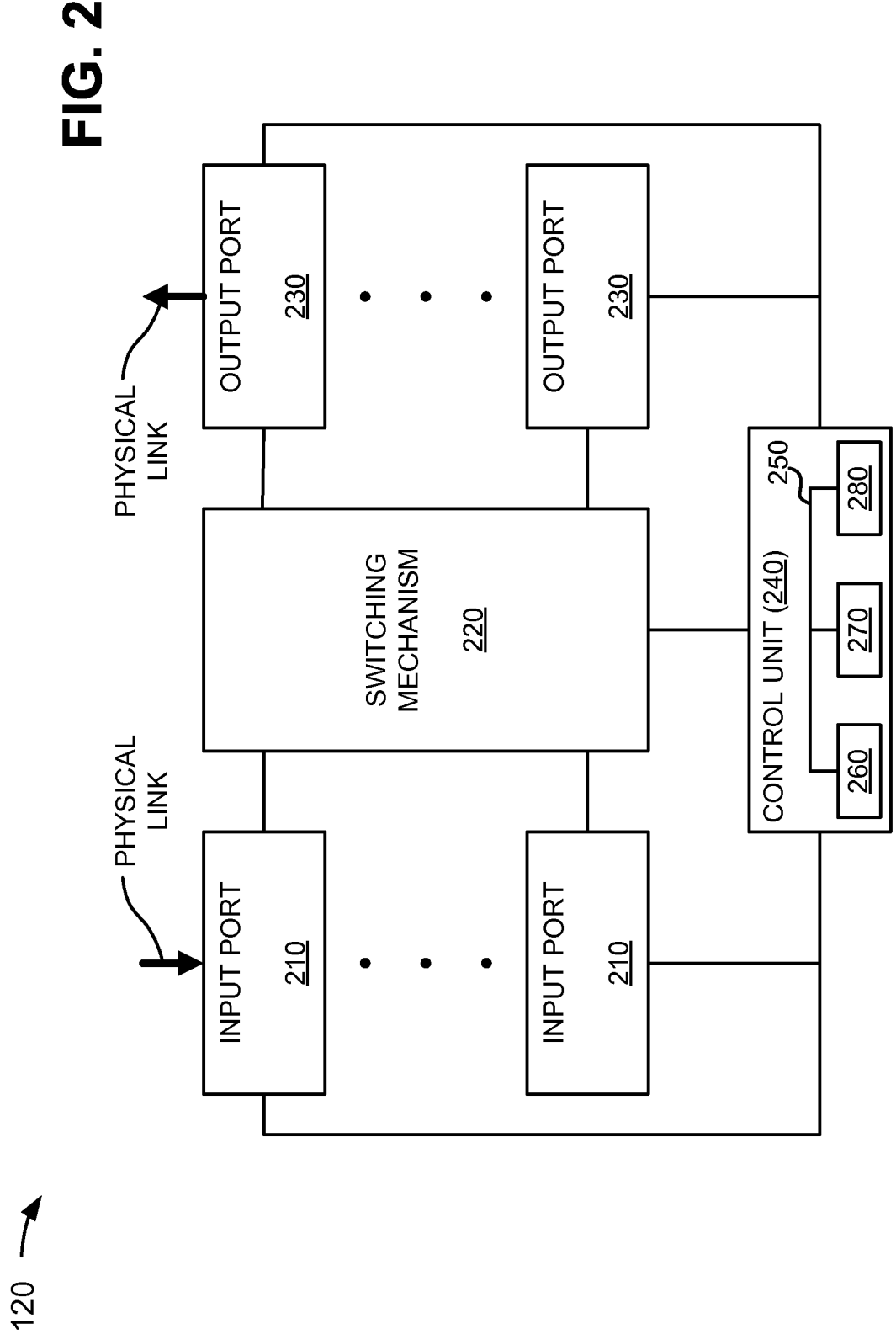
FIG. 2 is a diagram of exemplary components of a network device depicted in FIG. 1.

FIG. 2 illustrates a diagram of exemplary components of network device 120. As shown, network device 120 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In exemplary implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link). Output ports 230 may include scheduling algorithms that support priorities and guarantees. Output ports 230 may support data link layer encapsulation and decapsulation, and/or a variety of higher-level protocols. In an exemplary implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 120. Control unit 240 may handle any packet whose destination address may not be found in the forwarding table.

In an exemplary implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 120 may perform certain operations, as described in detail below. Network device 120 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of network device 120, in other implementations, network device 120 may contain fewer components, different components, differently arranged components, or additional components than depicted in FIG. 2. Alternatively, or additionally, one or more components of network device 120 may perform one or more other tasks described as being performed by one or more other components of network device 120.

FIG. 3 is a diagram of additional exemplary components of network device 120. As illustrated, network device 120 may include a group of input input/output (I/O) cards 300; a group of quality of service (QoS) cards 310; a group of connectivity fault management (CFM) cards 320; a group of secure processing cards 330; and/or a group of other cards 340. I/O cards 300, QoS cards 310, CFM cards 320, secure processing cards 330, and/or other cards 340 may interconnect via wired and/or wireless connections or links. In one exemplary implementation, one or more of cards 300-340 may be associated with one or more components of network device 120 depicted in FIG. 2.

Each of I/O cards 300 may include an input/output card that may be a point of attachment for a physical link and may be a point of entry for incoming packets to network device 120 or a point of exit for outgoing packets from network device 120. Each of I/O cards 300 may include a variety of physical interfaces for transmitting/receiving packets provided from/to network device 120. For example, each of I/O cards 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces. Each of I/O cards 300 may be associated with one or more of input ports 210 and/or output ports 230 (FIG. 2).

Each of QoS cards 310 may include a card that provides resource reservation control mechanisms for network device 120. For example, each of QoS cards 310 may provide a different priority to different applications, users, data flows, etc. associated with network device 120; may guarantee a certain level of performance (e.g., a required bit rate, delay, jitter, bit error rate, etc.) to a data flow associated with network device 120; etc.

Each of CFM cards 320 may include a card that provides operation, administration, and management (OAM) mechanisms for network device 120. For example, each of CFM cards 310 may provide proactive connectivity monitoring, fault verification, and/or fault isolation for network device 120.

Each of secure processing cards 330 may include a card that provides security services for network device 120. For example, each of secure processing cards 330 may provide firewall services, services to defend against threats, such as intrusions and denial-of-service attacks, etc.

Other cards 340 may include cards that provide a variety of functionality for network device 120. For example, other cards 340 may include routing engine (RE) cards, input packet forwarding engines (PFEs), output PFEs, switching fabrics, etc.

In one exemplary implementation, each of cards 300-340 may include several types of components (e.g., processors, memories, interfaces, etc.) that provide functionalities for each of cards 300-340. In one example, each of cards 300-340 may include a primary component (e.g., a main ASIC, a main FPGA, etc.) that controls the operation of each of cards 300-340. The primary component may be a subject of a remote test, analysis, debug operation, etc. generated by user device 110.

Although FIG. 3 shows exemplary components of network device 120, in other implementations, network device 120 may contain fewer components, different components, differently arranged components, or additional components than depicted in FIG. 3. Alternatively, or additionally, one or more components of network device 120 may perform one or more other tasks described as being performed by one or more other components of network device 120.

Exemplary Remote Testing of Network Device Component

Figure 4:
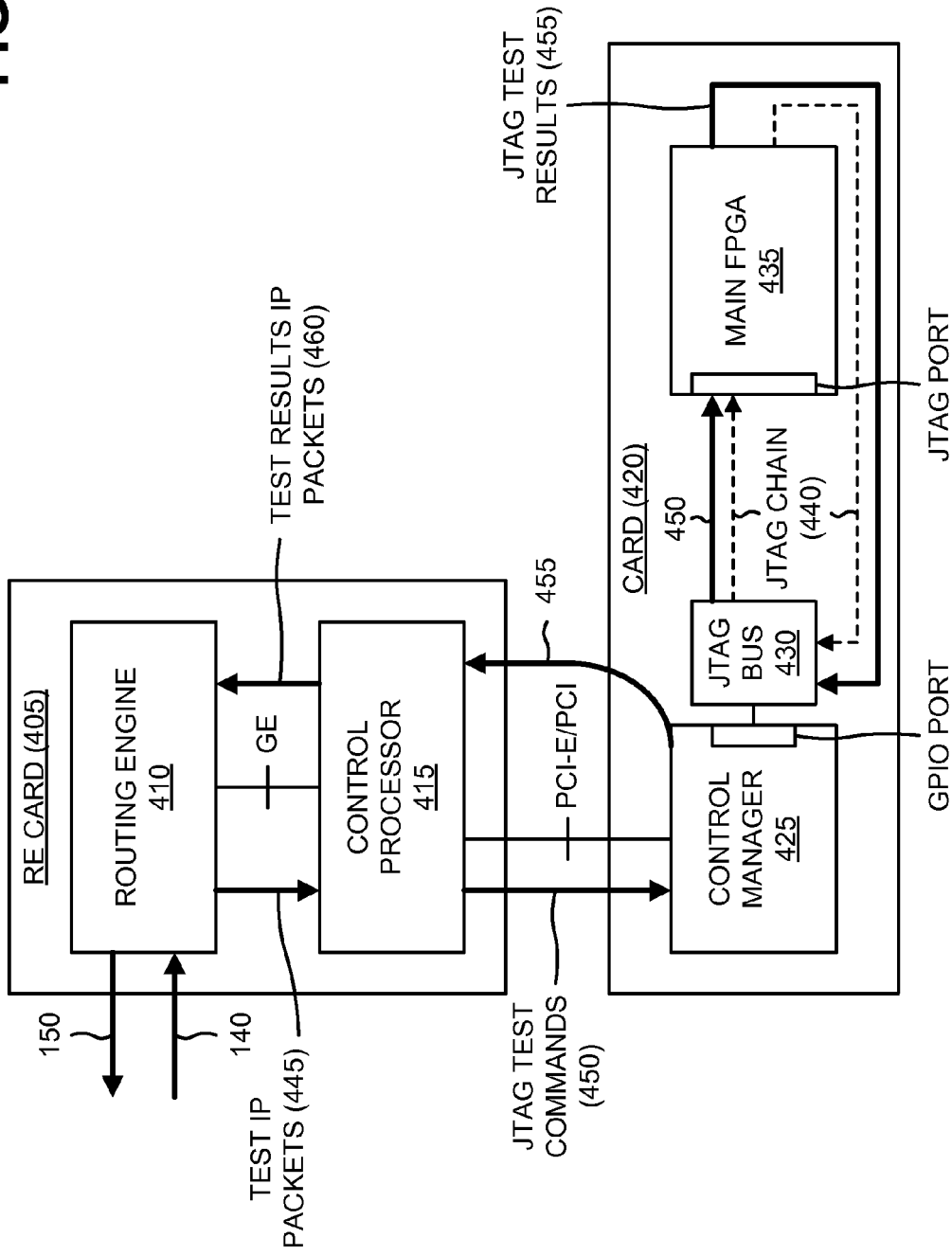
FIG. 4 is a diagram of exemplary interactions among components of an exemplary portion of the network device depicted in FIG. 1.

FIG. 4 is a diagram of exemplary interactions among components of an exemplary portion 400 of network device 120 (e.g. during remote testing of a component of network device 120). As shown, portion 400 may include a RE card 405 that includes a routing engine 410 and a control processor 415; and a card 420 that includes a control manager 425, a JTAG bus 430, and a main FPGA 435.

RE card 405 may provide routing engine functionality for network device 120 via routing engine 410 and/or control processor 415. Routing engine 410 may perform high level management functions for network device 120. For example, routing engine 410 may communicate with other networks and network devices connected to network device 120 to exchange information regarding network topology. Routing engine 410 may create routing tables based on network topology information and forwarding tables based on the routing tables. Routing engine 410 may also perform other general control and monitoring functions for network device 120. In one exemplary implementation, routing engine 410 may host remote connections (e.g., with user device 110) via a proxy daemon (e.g., a process that executes in the background and performs a particular operation at predefined times or in response to certain events).

Control processor 415 may include one or more processors, microprocessors, ASICs, FPGAs, or other types of processing units that may interpret and execute instructions. In an exemplary implementation, control processor 415 may execute instructions to perform operations described in connection with FIGS. 4 and 5. Control processor 415 may interconnect with routing engine 410 via a gigabyte Ethernet (GE) interface. In one example, control processor 415 may execute the server side of the ChipScope software (e.g., if main FPGA 435 is provided by Xilinx).

Card 420 may include one of I/O cards 300, QoS cards 310, CFM cards 320, secure processing cards 330, or other cards 340. Control manager 425 may include one or more processors, microprocessors, ASICs, FPGAs, or other types of processing units that may interpret and execute instructions. In an exemplary implementation, control manager 425 may execute instructions to perform operations described in connection with FIGS. 4 and 5. Control manager 425 may interconnect with control processor 415 via a Peripheral Component Interconnect Express (PCI-E) interface or a PCI interface.

JTAG bus 430 may include a bus that enables a component of network device 120 (e.g., main FPGA 435) to be tested (e.g., analyzed and/or debugged). JTAG bus 430 may include a four or five-pin interface added to a chip. For example, the four or five-pin interface may include a Test Data In (TDI) pin, a Test Data Out (TDO) pin, a Test Clock (TCK) pin, a Test Mode Select (TMS) pin, and a Test Reset (TRST) pin. A clock input may be provided at the TCK pin. Configuration may be performed by manipulating a state machine one bit at a time through the TMS pin. One bit of data may be transferred in and out, per TCK clock pulse, at the TDI and TDO pins, respectively. Different instruction modes may be provided to read a chip identification, to sample input pins, to drive output pins, to manipulate chip functions, etc. The TRST pin may include optional active-low reset to test logic. JTAG bus 430 may be designed so that multiple chips on a card (e.g., card 420) may have JTAG lines daisy-chained together, and a test probe may be connected to a single JTAG bus 430 so that the test probe may access all chips on card 420. For example, as shown in FIG. 4, JTAG bus 430 may provide a JTAG chain 440 between control manager 425 and main FPGA 435.

In one exemplary implementation, a JTAG port of main FPGA 435 may connect with a general purpose input/output (GPIO) port of control manager 425 via JTAG bus 430 and JTAG chain 440 so that control processor 415 (e.g., of RE card 405) may access JTAG chain 440 through the PCI-E/PCI interface.

Main FPGA 435 may include a FPGA that interprets and executes instructions to perform operations associated with card 420. For example, if card 420 is an I/O card 300, main FPGA 435 may control entry of incoming packets to network device 120 or exit of outgoing packets from network device 120. If card 420 is a CFM card 320, main FPGA 435 may provide OAM (e.g., proactive connectivity monitoring, fault verification, and/or fault isolation) mechanisms for network device 120. In one exemplary implementation, main FPGA 435 may be the component of network device 120 to be tested by a test remotely provided by user device 110. In one example, main FPGA 435 may include a FPGA provided by Xilinx.

As further shown in FIG. 4, routing engine 410 (e.g., via a management port connected to network 130 (not shown)) may receive requested test 140 from user device 110 (not shown). In one example, requested test 140 may be in the form of test IP packets 445 (e.g., IP packets that include information associated with analyzing and/or debugging main FPGA 435). Routing engine 410 may provide test IP packets 445 to control processor 415. However, test IP packets 445 may not be in a format that is understood by main FPGA 435. Thus, control processor 415 may convert test IP packets 445 into hardware (e.g., JTAG) test commands 450. JTAG test commands 450 may be in a format that is understood by main FPGA 435 and may include information associated with analyzing and/or debugging main FPGA 435. Control processor 415 may provide JTAG test commands 450 to control manager 425 (e.g., via the PCI-E/PCI interface).

Control manager 425 may provide JTAG test commands 450 to the JTAG port of main FPGA 435 (e.g., via the GPIO port, JTAG bus 430, and JTAG chain 440). Requested test 140 may be performed on main FPGA 435 (e.g., based on JTAG test commands 450) to produce hardware (e.g., JTAG) test results 455. JTAG test results 455 may include results associated with the analysis and/or debugging of main FPGA 435. For example, JTAG test results 455 may include an internal signal associated with main FPGA 435. JTAG test results 455 may be provided from main FPGA 435 to control manager 425 (e.g., via JTAG chain 440, JTAG bus 430, and the GPIO port), and control manager 425 may provide JTAG test results 455 to control processor 415.

Control processor 415 may receive JTAG test results 455 and may convert JTAG test results 455 into an IP packet format (e.g., as test results IP packets 460). Control processor 415 may provide test results IP packets 460 to routing engine 410, and routing engine 410 may provide test results IP packets 460 (e.g., as test results 150) to the remote user device 110 (not shown).

Although FIG. 4 shows exemplary components of portion 400 of network device 120, in other implementations, network device 120 may contain fewer components, different components, differently arranged components, or additional components than depicted in FIG. 4. Alternatively, or additionally, one or more components of network device 120 may perform one or more other tasks described as being performed by one or more other components of network device 120.

In one exemplary implementation, main FPGA 435 may be replaced with another main component of a card (e.g., card 420), such as a main ASIC, a main processor, etc. Furthermore, control manager 425 may be omitted, and JTAG bus 430/JTAG chain 440 may connect directly to a GPIO port (e.g., rather than the JTAG port) associated with main FPGA 435 and to the PCI-E/PCI interface associated with control processor 415.

Figure 5:
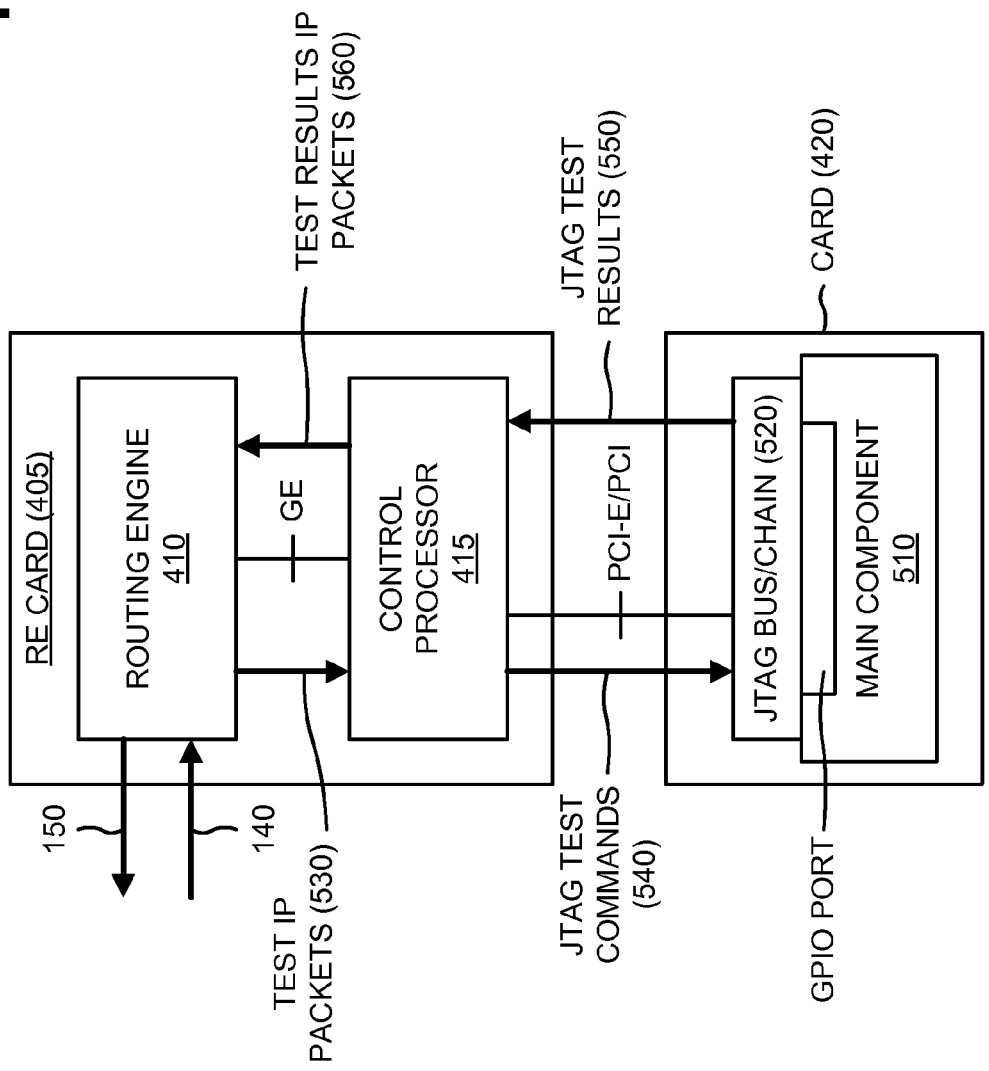
FIG. 5 is a diagram of exemplary interactions among components of another exemplary portion of the network device depicted in FIG. 1.

FIG. 5 is a diagram of exemplary interactions among components of another exemplary portion 500 of network device 120 (e.g. during remote testing of a component of network device 120). As shown, portion 500 may include RE card 405 (e.g., with routing engine 410 and control processor 415); and card 420 that includes a main component 510 and a JTAG bus/chain 520. RE card 405, routing engine 410, control processor 415, and card 420 may include the features described above in connection with FIG. 4.

Main component 510 may include a component (e.g., an ASIC, a FPGA, a processor, etc.) that interprets and executes instructions to perform operations associated with card 420. For example, if card 420 is an I/O card 300, main component 510 may control entry of incoming packets to network device 120 or exit of outgoing packets from network device 120. If card 420 is a CFM card 320, main component 510 may provide OAM (e.g., proactive connectivity monitoring, fault verification, and/or fault isolation) mechanisms for network device 120. In one exemplary implementation, main component 510 may be the component of network device 120 to be tested by a test remotely provided by user device 110.

JTAG bus/chain 520 may include the features described above in connection with JTAG bus 430 and JTAG chain 440.

JTAG bus/chain 520 may connect to a GPIO port of main component 510 and may connect to control processor 415 via the PCI-E/PCI interface.

As further shown in FIG. 5, routing engine 410 (e.g., via a management port connected to network 130 (not shown)) may receive requested test 140 from user device 110 (not shown). In one example, requested test 140 may be in the form of test IP packets 530 (e.g., IP packets that include information associated with analyzing and/or debugging main component 510). Routing engine 410 may provide test IP packets 530 to control processor 415. Control processor 415 may convert test IP packets 530 into hardware (e.g., JTAG) test commands 540. JTAG test commands 540 may be in a format that is understood by main component 510 and may include information associated with analyzing and/or debugging main component 510.

Control processor 415 may provide JTAG test commands 540 to the GPIO port of main component 510 (e.g., via the PCI-E/PCI interface and JTAG bus/chain 520). Requested test 140 may be performed on main component 510 (e.g., based on JTAG test commands 540) to produce hardware (e.g., JTAG) test results 550. JTAG test results 550 may include results associated with the analysis and/or debugging of main component 510. For example, JTAG test results 550 may include an internal signal associated with main component 510. JTAG test results 550 may be provided from main component 510 to control processor 415 (e.g., via the GPIO port, JTAG bus/chain 520, and the PCI-E/PCI interface).

Control processor 415 may receive JTAG test results 550 and may convert JTAG test results 550 into an IP packet format (e.g., as test results IP packets 560). Control processor 415 may provide test results IP packets 560 to routing engine 410, and routing engine 410 may provide test results IP packets 560 (e.g., as test results 150) to the remote user device 110 (not shown).

The arrangements depicted in FIGS. 4 and 5 may enable a developer (e.g., via user device 110) to remotely connect to a network device (e.g., network device 120) located in the field, and test one or more components of network device 120 (e.g., under field conditions) without shutting down network device 120 and/or removing the component(s) to be tested from network device 120. The arrangements depicted in FIGS. 4 and 5 may also enable a developer to test one or more components of network device 120 (e.g., under lab conditions) without removing the component(s) to be tested from network device 120. This may enable components of network devices to be quickly and efficiently debugged in the field environment (e.g., without disrupting a customer's network operation) as well as in the lab environment.

Although FIG. 5 shows exemplary components of portion 500 of network device 120, in other implementations, network device 120 may contain fewer components, different components, differently arranged components, or additional components than depicted in FIG. 5. Alternatively, or additionally, one or more components of network device 120 may perform one or more other tasks described as being performed by one or more other components of network device 120.

Exemplary Processes

Figure 6:
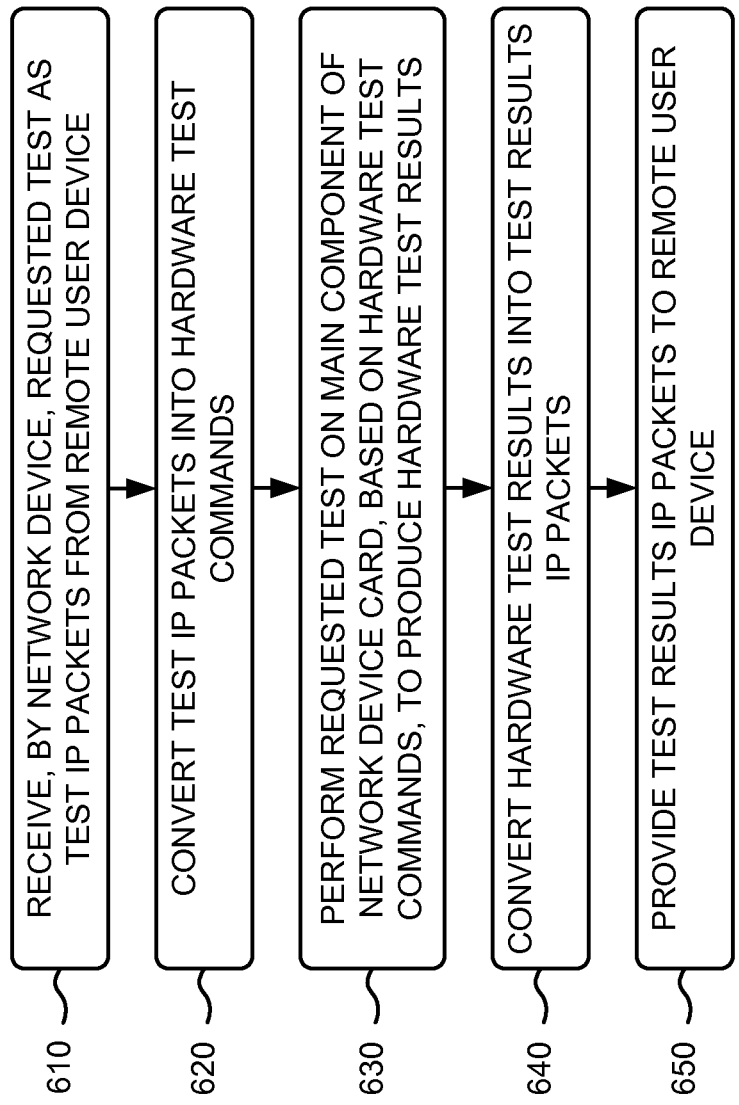

FIGS. 6 and 7 are flow charts of an exemplary process for remotely testing a network device component according to implementations described herein. In one implementation, process 600 may be performed by network device 120. In another implementation, some or all of process 600 may be performed by user device 110 in conjunction with network device 120.

As illustrated in FIG. 6, process 600 may include receiving, by a network device and from a remote user device, a requested test that includes test IP packets (block 610), and converting the test IP packets into hardware test commands (block 620). For example, in implementations described above in connection with FIG. 5, routing engine 410 (e.g., via a management port connected to network 130) may receive requested test 140 from user device 110. In one example, requested test 140 may be in the form of test IP packets 530 (e.g., IP packets that include information associated with analyzing and/or debugging main component 510). Routing engine 410 may provide test IP packets 530 to control processor 415. Control processor 415 may convert test IP packets 530 into hardware test commands 540. Hardware test commands 540 may be in a format that is understood by main component 510 and may include information associated with analyzing and/or debugging main component 510.

As further shown in FIG. 6, process 600 may include performing the requested test on a main component of a network device card, based on the hardware test commands, to produce hardware test results (block 630). For example, in implementations described above in connection with FIG. 5, control processor 415 may provide hardware test commands 540 to the GPIO port of main component 510. Requested test 140 may be performed on main component 510 (e.g., based on hardware test commands 540) to produce hardware test results 550. Hardware test results 550 may include results associated with the analysis and/or debugging of main component 510. For example, hardware test results 550 may include an internal signal associated with main component 510. Hardware test results 550 may be provided from main component 510 to control processor 415.

Returning to FIG. 6, process 600 may include converting the hardware test results into test results IP packets (block 640), and providing the test results IP packets to the remote user device (block 650). For example, in implementations described above in connection with FIG. 5, control processor 415 may receive hardware test results 550 and may convert hardware test results 550 into an IP packet format (e.g., as test results IP packets 560). Control processor 415 may provide test results IP packets 560 to routing engine 410, and routing engine 410 may provide test results IP packets 560 (e.g., as test results 150) to the remote user device 110. User device 110 may perform additional analyses of test results 150.

Process blocks 620-640 may include the process blocks depicted in FIG. 7. As shown in FIG. 7, process blocks 620-640 may include converting the test IP packets into JTAG commands (block 700), and performing the requested test on a main FPGA of a network device card, based on the JTAG test commands, to produce test results in a JTAG format (block 710). For example, in implementations described above in connection with FIG. 4, control processor 415 may convert test IP packets 445 into JTAG test commands 450. JTAG test commands 450 may be in a format that is understood by main FPGA 435 and may include information associated with analyzing and/or debugging main FPGA 435. Control processor 415 may provide JTAG test commands 450 to control manager 425. Control manager 425 may provide JTAG test commands 450 to the JTAG port of main FPGA 435. Requested test 140 may be performed on main FPGA 435 (e.g., based on JTAG test commands 450) to produce JTAG test results 455. JTAG test results 455 may include results associated with the analysis and/or debugging of main FPGA 435. In one example, JTAG test results 455 may include an internal signal associated with main FPGA 435. JTAG test results 455 may be provided from main FPGA 435 to control manager 425, and control manager 425 may provide JTAG test results 455 to control processor 415.

As further shown in FIG. 7, process blocks 620-640 may include converting the test results, in the JTAG format, into test results in an IP packet format (block 720). For example, in implementations described above in connection with FIG. 4, control processor 415 may receive JTAG test results 455 and may convert JTAG test results 455 into an IP packet format (e.g., as test results IP packets 460). Control processor 415 may provide test results IP packets 460 to routing engine 410, and routing engine 410 may provide test results IP packets 460 (e.g., as test results 150) to the remote user device 110. User device 110 may perform additional analyses of test results 150.

CONCLUSION

Implementations described herein may include systems and/or methods that may provide a technique for remotely testing (e.g., analyzing and/or debugging) a component of a network device. In an exemplary implementation, a network device may receive a requested test (e.g., that include test Internet protocol (IP) packets) from a remote user device, and may convert the test IP packets into hardware test commands (e.g., JTAG test commands). The network device may perform, based on the hardware test commands, the requested test on a primary component of a network device card to produce hardware test results. The network device may convert the hardware test results to test results into an IP packet format, and may provide the test results (e.g., in the IP packet format) to the remote user device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device and from a remote user device, a requested test that includes test Internet protocol (IP) packets,
   the requested test being to test the network device;
   identifying, by the network device, a component of a network device card associated with the network device,
   the requested test being performed on the component of the network device card;
   determining, by the network device, a type of packet format that is understood by the component of the network device card;
   determining, by the network device, that a format of the test IP packets is not associated with the type of packet format that is understood by the component of the network device card;
   converting, by the network device and based on determining that the format of the test IP packets is not associated with the type of packet format that is understood by the component of the network device card, the test IP packets into hardware test commands,
   the hardware test commands being associated with the type of packet format that is understood by the component of the network device card;
   performing, by the network device and based on the hardware test commands, the requested test on the component of the network device card to produce hardware test results;
   converting, by the network device, the hardware test results into test results in an IP packet format; and
   providing, by the network device, the tests results in the IP packet format to the remote user device.

2. The method of claim 1, where the requested test includes information associated with analyzing and debugging the component of the network device card.

3. The method of claim 1, where the component of the network device card comprises one of:
   an application-specific integrated circuit (ASIC) of the network device card, or
   a field-programmable gate array (FPGA) of the network device card.

4. The method of claim 1, where converting the test IP packets comprises:
   converting the test IP packets into joint test action group (JTAG) test commands.

5. The method of claim 4, where performing the requested test comprises:
   performing, based on the JTAG test commands, the requested test on a field-programmable gate array (FPGA) of the network device card to produce test results in a JTAG format.

6. The method of claim 5, where converting the hardware test results comprises:
   converting the test results, from the JTAG format, into tests results in the IP packet format.

7. The method of claim 1, where the network device comprises one or more of:
   a gateway,
   a router,
   a switch,
   a firewall,
   a network interface card (NIC),
   a hub,
   a bridge,
   a proxy server, or
   an optical add-drop multiplexer (OADM).

8. A network device comprising:
a processor to:
receive, from a remote user device, a requested test that includes test Internet protocol (IP) packets,
the requested test being to test the network device; and
provide the test IP packets to a control processor;
the control processor to:
identify a component of a network device card associated with the network device,
the requested test being performed on the component of the network device card;
determine a type of packet format that is understood by the component of the network device card;
determine that a format of the test IP packets is not associated with the type of packet format that is understood by the component of the network device card;
convert, based on determining that the format of the test IP packets is not associated with the type of packet format that is understood by the component of the network device card, the test IP packets into hardware test commands,
the hardware test commands being associated with the type of packet format that is understood by the component of the network device card; and
provide the hardware test commands to a control manager of the network device card; and
the control manager to:
perform, based on the hardware test commands, the requested test on the component of the network device card to produce hardware test results; and
provide the hardware test results to the control processor;
the control processor being further to:
convert the hardware test results into test results in an IP packet format; and
provide the test results in the IP packet format to the processor;
the processor being further to:
provide the tests results in the IP packet format to the remote user device.

9. The network device of claim 8, where the network device comprises one or more of:
a gateway,
a router,
a switch,
a firewall,
a network interface card (NIC),
a hub,
a bridge,
a proxy server, or
an optical add-drop multiplexer (OADM).

10. The network device of claim 8, where the requested test includes information associated with analyzing and debugging the component of the network device card.

11. The network device of claim 8, where the network device card comprises one of:
an input input/output (I/O) card,
a quality of service (QoS) card,
connectivity fault management (CFM) card,
a secure processing card, or
a card for routing data.

12. The network device of claim 8, where the component of the network device card comprises one of:
an application-specific integrated circuit (ASIC) of the network device card, or
a field-programmable gate array (FPGA) of the network device card.

13. The network device of claim 8, where the hardware test commands include joint test action group (JTAG) test commands.

14. The network device of claim 13, where, when performing the requested test, the control manager is further to:
perform, based on the JTAG test commands, the requested test on a field-programmable gate array (FPGA) of the network device card to produce test results in a JTAG format.

15. The network device of claim 14, where, when converting the hardware test results, the control processor is further to:
convert the test results, from the JTAG format, into tests results in the IP packet format.

16. A system comprising:
a network device in communication with a user device, the network device being to:
receive, from the user device, a requested test that includes test Internet protocol (IP) packets,
the requested test being to test the network device;
identify a component of a network device card associated with the network device,
the requested test being performed on the component of the network device card;
determine a type of packet format that is understood by the component of the network device card;
determine that a format of the test IP packets is not associated with the type of packet format that is understood by the component of the network device card;
convert, based on determining that the format of the test IP packets is not associated with the type of packet format that is understood by the component of the network device card, the test IP packets into hardware test commands,
the hardware test commands being associated with the type of packet format that is understood by the component of the network device card;
perform, based on the hardware test commands, the requested test on the component of the network device card to produce hardware test results;
convert the hardware test results into test results in an IP packet format; and
provide the tests results in the IP packet format to the remote user device.

17. The system of claim 16, where the requested test includes information associated with analyzing and debugging the component of the network device card.

18. The system of claim 16, where the component of the network device card comprises one of:
an application-specific integrated circuit (ASIC) of the network device card, or
a field-programmable gate array (FPGA) of the network device card.

19. The system of claim 16, where the network device is further to:
convert the test IP packets into joint test action group (JTAG) test commands,
perform, based on the JTAG test commands, the requested test on a field-programmable gate array (FPGA) of the network device card to produce test results in a JTAG format, and
convert the test results, in the JTAG format, into tests results in the IP packet format.

20. The system of claim 16, where the network device comprises one or more of:
a gateway,
a router,
a switch,
a firewall,
a network interface card (NIC),
a hub,
a bridge,
a proxy server, or
an optical add-drop multiplexer (OADM).

* * * * *